US012652372B2

(12) United States Patent
    Kubo et al.

(10) Patent No.: US 12,652,372 B2
(45) Date of Patent: Jun. 9, 2026

(54) SERVER APPARATUS, SYSTEM, AND OPERATING METHOD OF SYSTEM

(71) Applicant: TOYOTA JIDOSHA KABUSHIKI KAISHA, Toyota (JP)

(72) Inventors: Chikage Kubo, Chofu (JP); Kazuya Nishimura, Anjo (JP); Wataru Minoura, Nagoya (JP); Yuki Tatsumoto, Seto (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 249 days.

(21) Appl. No.: 18/295,315

(22) Filed: Apr. 4, 2023

(65) Prior Publication Data

US 2023/0319240 A1     Oct. 5, 2023

(30) Foreign Application Priority Data

Apr. 5, 2022    (JP) ................................. 2022-063119

(51) Int. Cl.
    *H04N 7/18*       (2006.01)
    *G06Q 10/0631*    (2023.01)
    *G06V 20/56*      (2022.01)
    *H04W 4/029*      (2018.01)

(52) U.S. Cl.
    CPC ..... *H04N 7/185* (2013.01); *G06Q 10/063114* (2013.01); *G06V 20/56* (2022.01); *H04W 4/029* (2018.02)

(58) Field of Classification Search
    CPC .................. H04N 7/185; H04W 4/029; G06Q 10/063114; G06V 20/56
    USPC ........................................................ 348/148
    See application file for complete search history.

(56) References Cited

U.S. PATENT DOCUMENTS

| | | | |
|---|---|---|---|
| 2005/0085242 A1 | 4/2005 | Nishizawa | |
| 2017/0344928 A1 | 11/2017 | Shimura | |
| 2020/0175558 A1* | 6/2020 | Fujimoto | ........... G01C 21/3453 |
| 2021/0264783 A1* | 8/2021 | Suzuki | ................... G08G 1/017 |
| 2022/0270374 A1* | 8/2022 | Crawford | ............. G05D 1/0038 |

FOREIGN PATENT DOCUMENTS

| | | |
|---|---|---|
| JP | 2005173784 A | 6/2005 |
| JP | 2017215769 A | 12/2017 |
| JP | 2018133055 A | 8/2018 |
| WO | 2019/243860 A1 | 12/2019 |

* cited by examiner

*Primary Examiner* — John W Miller
*Assistant Examiner* — Omer Khalid
(74) *Attorney, Agent, or Firm* — Dickinson Wright, PLLC

(57) ABSTRACT

A server apparatus includes a communication interface and a controller configured to transmit and receive information to and from another apparatus via the communication interface, wherein the controller is configured to transmit information to a vehicle about a boarding point, designated by a terminal apparatus, at which a user is to board the vehicle, and transmit, to the terminal apparatus, a captured image of surroundings of the vehicle, the captured image being captured by the vehicle during travel to the boarding point.

20 Claims, 7 Drawing Sheets

13

TERMINAL APPARATUS

| COMMUNICATION INTERFACE | ~41 |

| MEMORY | ~42 |

| CONTROLLER | ~43 |

| POSITIONER | ~44 |

| INPUT INTERFACE | ~45 |

| OUTPUT INTERFACE | ~46 |

SERVER APPARATUS, SYSTEM, AND OPERATING METHOD OF SYSTEM

CROSS-REFERENCE TO RELATED APPLICATION

This application claims priority to Japanese Patent Application No. 2022-063119, filed on Apr. 5, 2022, the entire contents of which are incorporated herein by reference.

TECHNICAL FIELD

The present disclosure relates to a server apparatus, a system, and an operating method of a system.

BACKGROUND

Various technologies have been proposed to improve convenience for users in car sharing, during which vehicles are shared by a plurality of users. For example, Patent Literature (PTL) 1 discloses technology for managing the status of staff members participating in a delivery-based car sharing service in which provided vehicles are delivered to users by the staff members.

CITATION LIST

Patent Literature

PTL 1: JP 2017-215769 A

SUMMARY

Delivery-based car sharing has room for further improvement in user convenience.

A server apparatus and the like that can improve user convenience in delivery-based car sharing are disclosed below.

A server apparatus according to the present disclosure includes:
  a communication interface; and
  a controller configured to transmit and receive information to and from another apparatus via the communication interface, wherein
  the controller is configured to transmit information to a vehicle about a boarding point, designated by a terminal apparatus, at which a user is to board the vehicle, and transmit, to the terminal apparatus, a captured image of surroundings of the vehicle, the captured image being captured by the vehicle during travel to the boarding point.

A system in the present disclosure includes a server apparatus and a vehicle configured to communicate with each other, wherein
  the server apparatus is configured to transmit information to the vehicle about a boarding point, designated by a terminal apparatus, at which a user is to board the vehicle,
  the vehicle is configured to capture an image of surroundings of the vehicle during travel to the boarding point, and
  the server apparatus is configured to transmit the captured image to the terminal apparatus.

An operating method of a system in the present disclosure is an operating method of a system including a server apparatus and a vehicle configured to communicate with each other, the operating method including:

transmitting, by the server apparatus, information to the vehicle about a boarding point, designated by a terminal apparatus, at which a user is to board the vehicle;
  capturing, by the vehicle, an image of surroundings of the vehicle during travel to the boarding point; and
  transmitting, by the server apparatus, the captured image to the terminal apparatus.

According to the server apparatus and the like in the present disclosure, user convenience in delivery-based car sharing can be improved.

BRIEF DESCRIPTION OF THE DRAWINGS

In the accompanying drawings.

DETAILED DESCRIPTION

Embodiments are described below.

Figure 1:
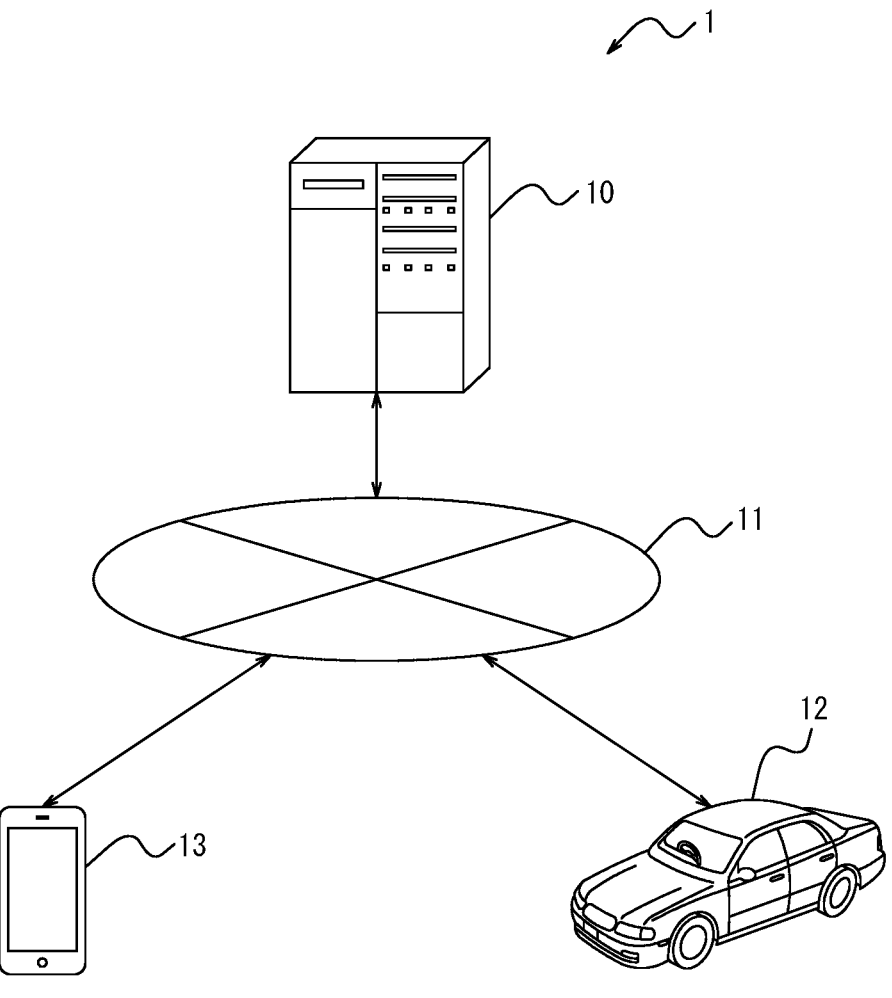
FIG. 1 is a diagram illustrating an example configuration of an information processing system.

FIG. 1 is a diagram illustrating an example configuration of an information processing system according to an embodiment. An information processing system 1 is a system for supporting the delivery of a vehicle 12 during car sharing. Alternatively, the information processing system 1 may be a system that supports vehicle dispatch in a service such as ride sharing or a taxi service. An information processing system 1 includes one or more each of a server apparatus 10, a vehicle 12, and a terminal apparatus 13 communicably connected to each other via a network 11. The server apparatus 10 is, for example, a server computer that belongs to a cloud computing system or other computing system and functions as a server that implements various functions. The vehicle 12 is a vehicle used in car sharing or the like and is a passenger car, a commercial vehicle, or the like provided with communication functions and information processing functions. The vehicle 12 is connected to the network 11 via a mobile communication network. The vehicle 12 is driven manually, but a portion of driving may be automated. The vehicle 12 is any type of automobile such as a gasoline vehicle, a Battery Electric Vehicle (BEV), a Hybrid Electric Vehicle (HEV), a Plug-in Hybrid Electric Vehicle (PHEV), or a Fuel Cell Electric Vehicle (FCEV). The terminal apparatus 13 is an information processing apparatus used by the user of the vehicle 12. The terminal apparatus 13 is, for example, a smartphone, a tablet terminal, or the like. The network 11 is the Internet, for example, but may also be an ad-hoc network, a LAN, a Metropolitan Area Network (MAN), other networks, or a combination of two or more thereof.

In the present embodiment, the server apparatus 10 transmits information to the vehicle 12 about a boarding point, specified on the terminal apparatus 13, at which the user is to board the vehicle 12, and transmits, to the terminal apparatus 13, captured images of surroundings of the vehicle 12, the images being captured by the vehicle 12 during travel to the boarding point. Since the user can view the images captured by the vehicle 12 on the terminal apparatus 13, the user can visually confirm the conditions in the vicinity of the boarding point and can identify the boarding point using a richer amount of information than in the case of identification on a map. The convenience for the user can thereby be increased.

Figure 2:
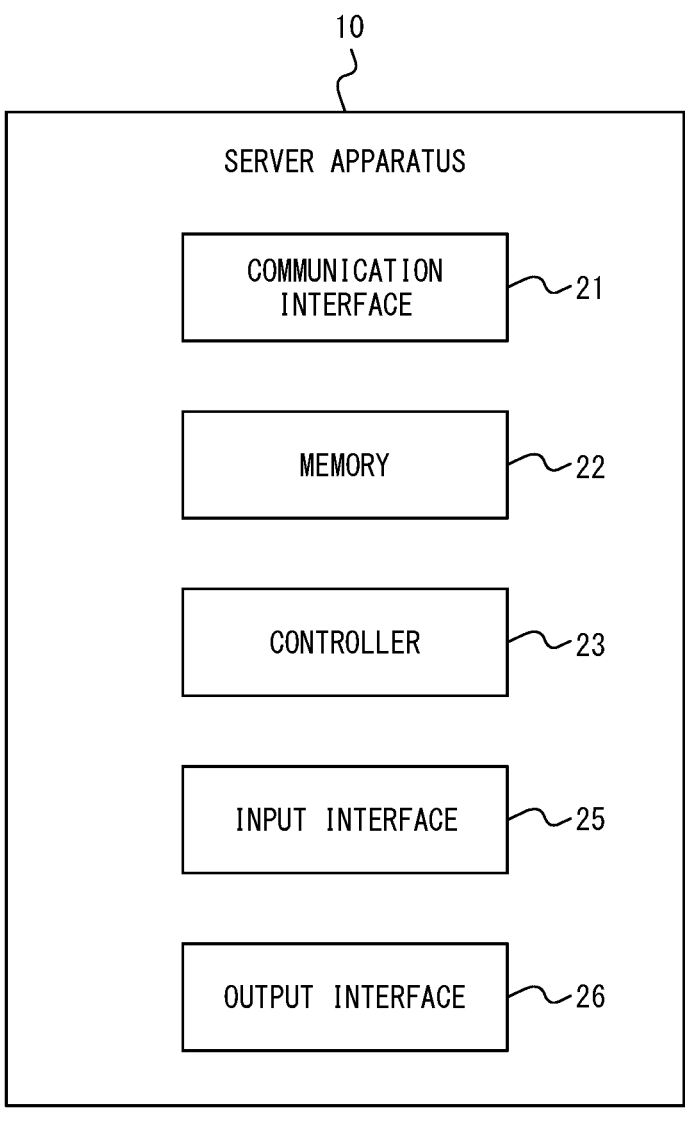
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single server computer. The server apparatus 10 may be two or more server computers that are communicably connected to each other and operate in cooperation. In this case, the configuration illustrated in FIG. 2 is arranged among two or more server computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the vehicle 12 or the terminal apparatus 13 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EE-PROM). The memory 22 stores information to be used for the operations of the server apparatus 10 and information obtained by the operations of the server apparatus 10.

The controller 23 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit includes, for example, a field-programmable gate array (FPGA), an application specific integrated circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a liquid crystal display (LCD) or an organic electro-luminescent (EL) display. The output interface 26 outputs information obtained by the operations of the server apparatus 10.

The functions of the server apparatus 10 are realized by a processor included in the controller 23 executing a control program. The control program is a program for causing a computer to execute the processing of steps included in the operations of the server apparatus 10, thereby enabling the computer to realize the functions corresponding to the processing of the steps. That is, the control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
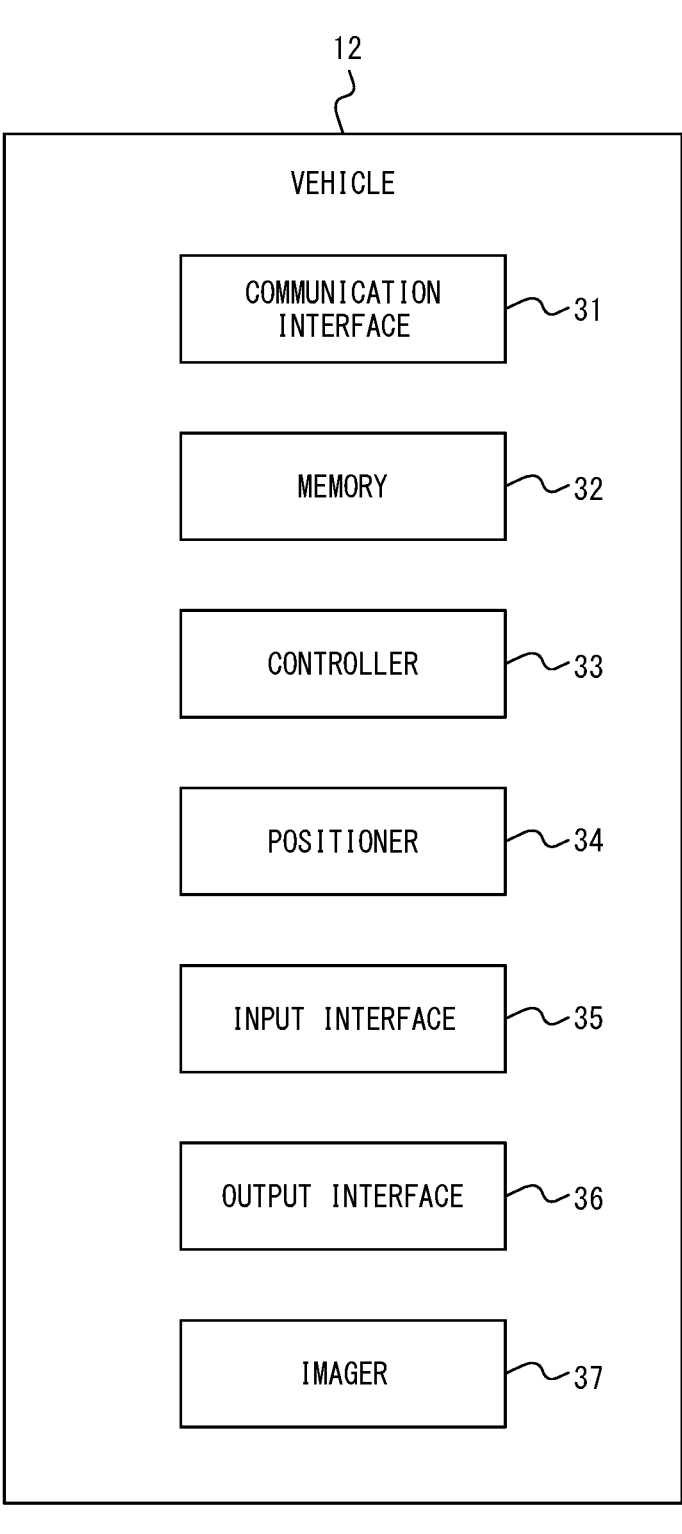
FIG. 3 is a diagram illustrating an example configuration of a terminal apparatus.

FIG. 3 illustrates a configuration example of the vehicle 12. The vehicle 12 includes a communication interface 31, a memory 32, a controller 33, a positioner 34, an input interface 35, an output interface 36, and an imager 37. These components may be configured as a single control apparatus, by two or more control apparatuses, or by other apparatuses, such as a control apparatus and a communication device. The control apparatus includes an electronic control unit (ECU), for example. The communication device includes a data communication module (DCM), for example. The control apparatus may be configured to include a personal computer, a tablet terminal, a smartphone terminal, a navigation apparatus, or the like. The components are communicably connected to each other, or to other devices and apparatuses in the vehicle 12, by an in-vehicle network compliant with standards such as a controller area network (CAN).

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33. The controller 33 connects to the network 11 using the communication interface 31 through a mobile communication base station and communicates information with other apparatuses via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing related to operations of the vehicle 12 while controlling the components of the controller 33.

The positioner 34 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioner 34 acquires the positional information for the vehicle 12 and transmits the positional information to the controller 33.

The input interface 35 includes one or more interfaces for input. The interface for input is, for example, a physical key, a capacitive key, a pointing device, a touch screen integrally provided with a display, or a microphone that receives audio input. The interface for input may further include a camera or IC card reader that captures image codes. The input interface 35 accepts user operations to input information used for operation of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs the information obtained by the operation of controller 33, for example, to the user.

The imager 37 includes one or more cameras that, for example, capture images of the scenery/subjects in the travel direction of the vehicle 12, to the sides of the vehicle 12, or behind the vehicle 12. The cameras provided in the imager 37 may be monocular cameras or may be stereo cameras. The imager 37 may also include a distance-measuring sensor that measures the distance to a subject and acquires a distance image. The imager 37 transmits the captured images obtained by capturing scenery, subjects, and the like to the controller 33.

The functions of the controller 33 are realized by a processor included in the controller 33 executing a control program. The control program is a program for causing a computer to execute the processing of steps included in operations of the controller 33, thereby enabling the computer to realize the functions corresponding to the processing of the steps. That is, the control program is a program for causing a computer to function as the controller 33. Some or all of the functions of the controller 33 may be realized by a dedicated circuit included in the controller 33.

The controller 33 generates information for control of various mechanisms and apparatuses of the vehicle 12 and transmits the information for control to the control circuits of the various mechanisms and apparatuses to control the mechanisms and apparatuses.

Figure 4:
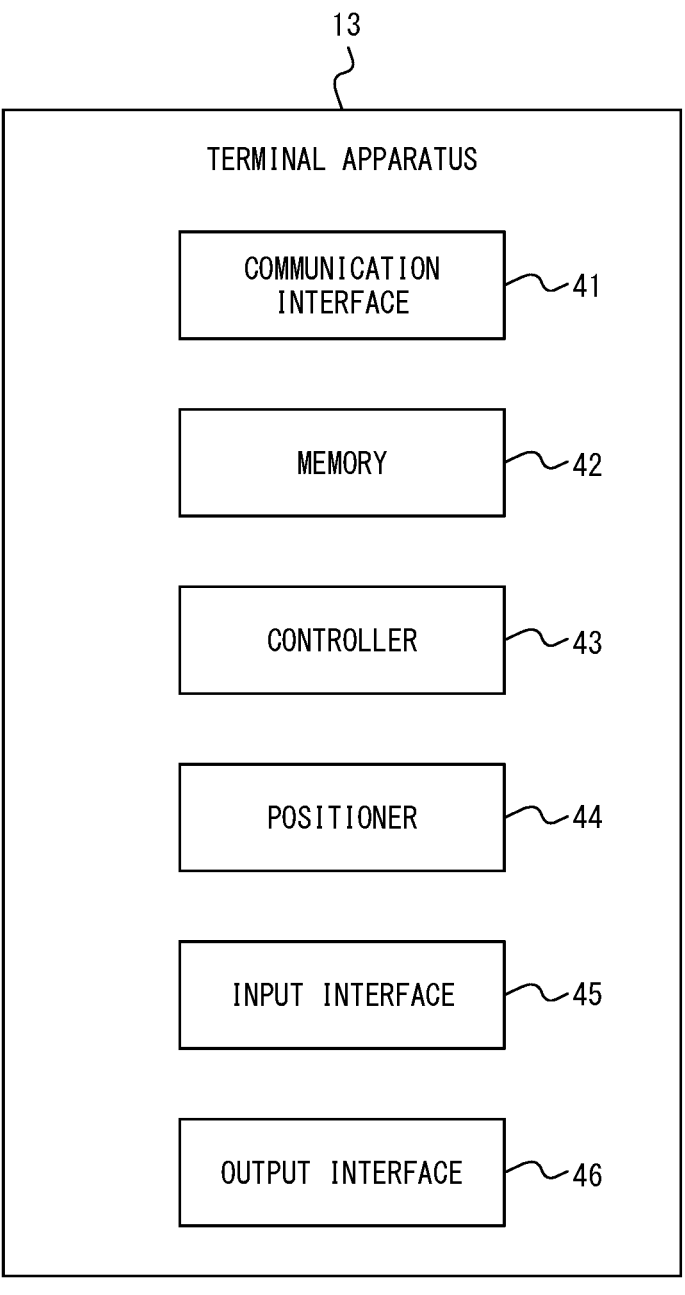
FIG. 4 is a diagram illustrating an example configuration of a vehicle.

FIG. 4 is a diagram illustrating a configuration of the terminal apparatus 13. The terminal apparatus 13 is, for example, an information terminal apparatus such as a smartphone, a tablet terminal apparatus, or the like. The terminal apparatus 13 includes a communication interface 41, a memory 42, a controller 43, a positioner 44, an input interface 45, and an output interface 46.

The communication interface 41 includes a communication module compliant with a wired or wireless LAN standard, a module compliant with a mobile communication standard such as LTE, 4G, or 5G, or the like. The terminal apparatus 13 connects to the network 11 via a nearby router apparatus or mobile communication base station using the communication interface 41 and communicates information with other apparatuses over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the terminal apparatus 13 by operating according to the control/processing programs or operating according to operation procedures implemented in the form of circuits. The controller 43 then transmits and receives various types of information to and from the server apparatus 10 and the like via the communication interface 41 and executes the operations according to the present embodiment.

The positioner 44 includes one or more GNSS receivers. GNSS includes, for example, GPS, QZSS, BeiDou, GLONASS, and/or Galileo. The positioner 44 acquires the positional information for the terminal apparatus 13 and transmits the positional information to the controller 43.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

Operations of the information processing system 1 are described next with reference to FIGS. 5, 6A, and 6B.

Figure 5:
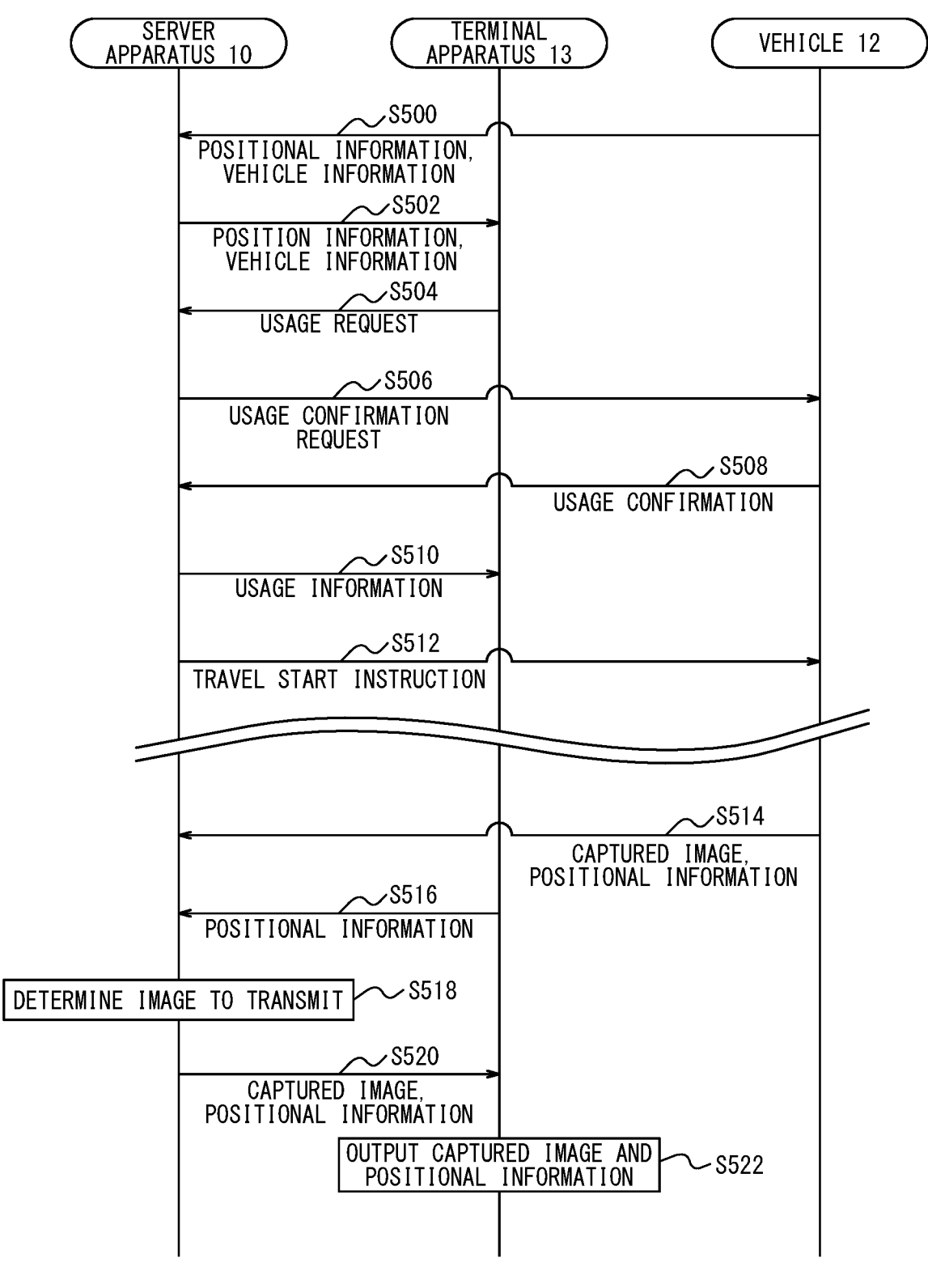
FIG. 5 is a sequence diagram illustrating example operations of the information processing system.
Figure 6A:
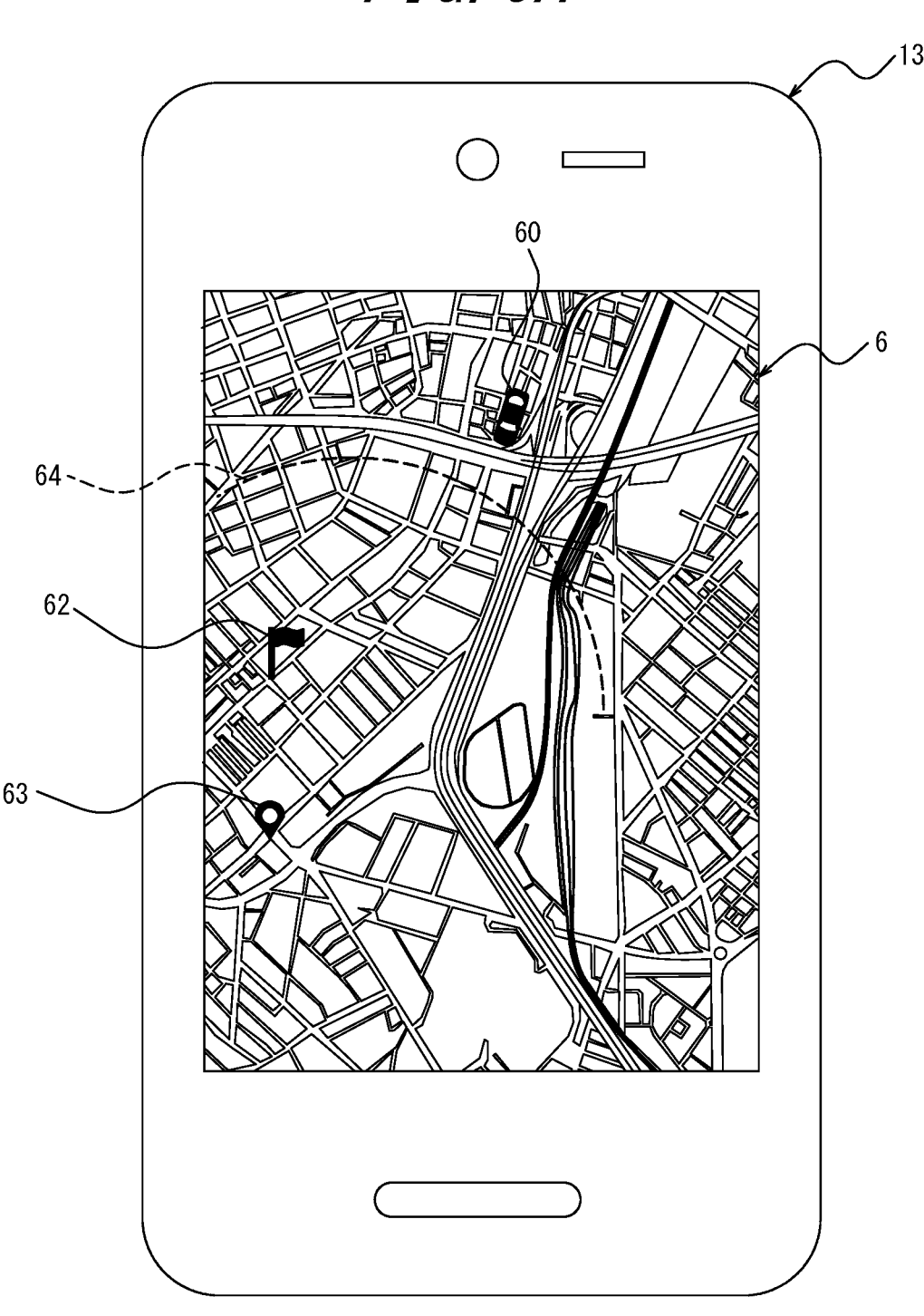
FIG. 6A is a diagram illustrating an example display screen on a terminal apparatus.
Figure 6B:
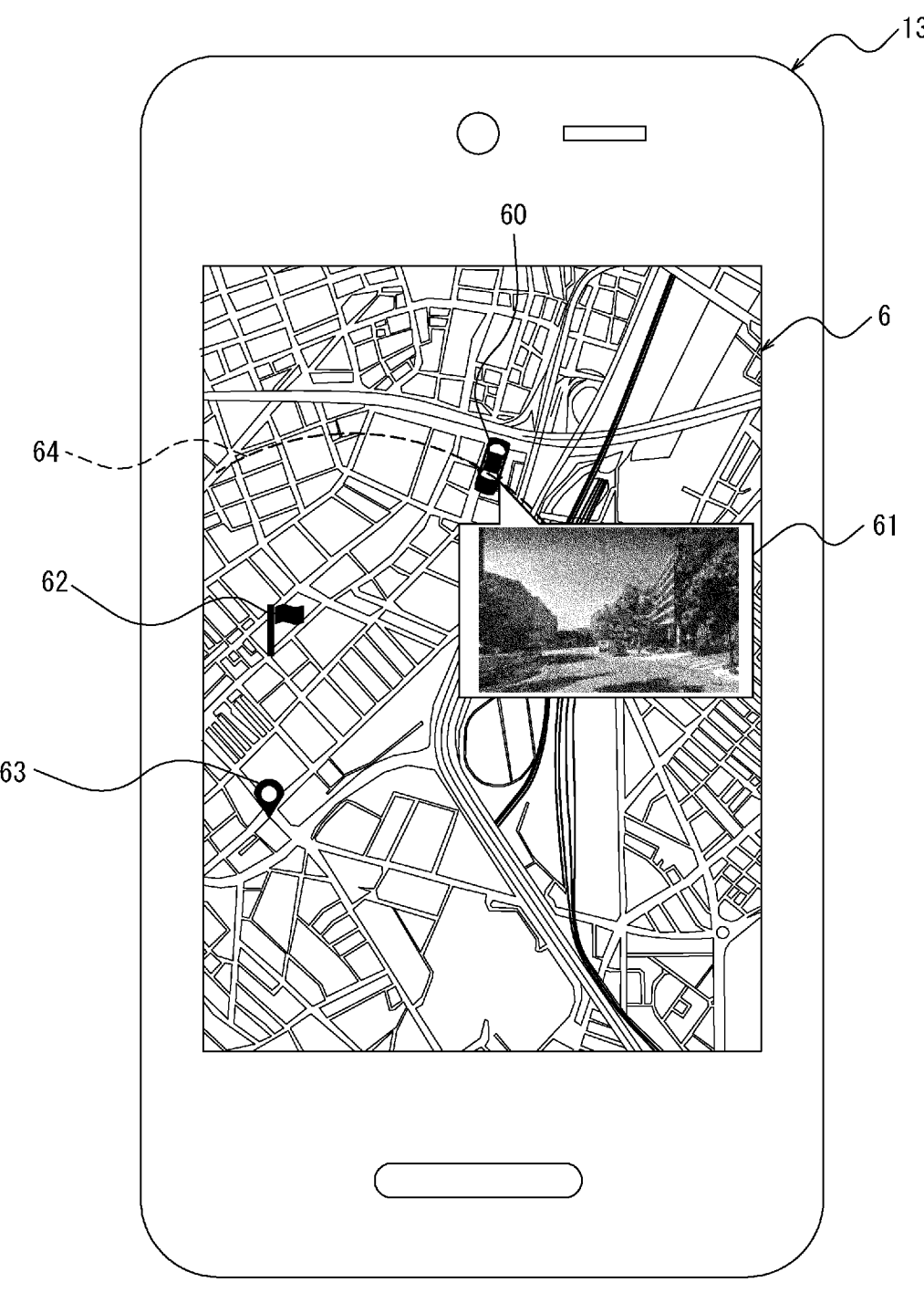
FIG. 6B is a diagram illustrating an example display screen on a terminal apparatus.

FIG. 5 is a sequence diagram to illustrate the operating procedures of the information processing system 1 in the present embodiment. FIG. 5 illustrates the steps in the coordinated operation of the server apparatus 10, the vehicle 12, and the terminal apparatus 13. The steps pertaining to the various information processing by the server apparatus 10, the vehicle 12, and the terminal apparatus 13 in FIG. 5 are performed by the respective controllers 23, 33, 43. The steps pertaining to transmitting and receiving various types of information to and from the server apparatus 10, the vehicle 12, and the terminal apparatus 13 are performed by the respective controllers 23, 33, 43 transmitting and receiving information to and from each other via the respective communication interfaces 21, 31, 41. In the server apparatus 10, the vehicle 12, and the terminal apparatus 13, the respective controllers 23, 33, 43 appropriately store the information that is transmitted and received in the respective memories 22, 32, 42. Furthermore, the controllers 23, 33, 43 accept input of various information by the respective input interfaces 25, 35, 45 and output various information by the respective output interfaces 26, 36, 46.

In step S500, the vehicle 12 transmits positional information and vehicle information to the server apparatus 10. The vehicle information includes, for example, identification information, the model, the type, and the specifications of the vehicle. The vehicle information may include information about the owner or driver. Next, in step S502, the server apparatus 10 transmits the positional information and the vehicle information for the vehicle 12 to the terminal apparatus 13. The terminal apparatus 13 then transmits a usage request for the vehicle 12 to the server apparatus 10. The usage request is generated and transmitted to the server apparatus 10 by the user operating the terminal apparatus 13. The usage request includes information identifying the vehicle 12 that the user wishes to use and information such as the boarding point and the boarding time.

In steps S500 to S504, the user of the terminal apparatus 13 uses, for example, the terminal apparatus 13 to access a portal site, for members of the car sharing service or the like, provided by the server apparatus 10. The portal site displays, for example, the type of vehicle, position, and the like of one or more of the usable vehicles 12. The user selects the vehicle 12 that the user wishes to use and also inputs the boarding point, boarding time, the user's member ID, and the like to the terminal apparatus 13. For example, as illustrated in FIG. 6A, the terminal apparatus 13 displays a map 6 that includes the position 60 of the vehicle 12 and the current position 63 of the terminal apparatus 13. The user inputs the selection of the vehicle 12 and the designation of the boarding point 62 by, for example, tapping on the position 60 of the vehicle 12 and the desired boarding point 62 on the map 6. The user may also provide input by a sliding movement on the map 6, for example, to designate a boundary 64 of the reference range for displaying the image captured by the vehicle 12. The reference range is any appropriate range of the distance from the boarding point 62. In a case in which the boundary 64 of the reference range is not designated, a range with a freely set initial value (for example, several hundred meters) may be used as the reference range. The terminal apparatus 13 generates a usage request based on the information identifying the selected vehicle 12 and the inputted information and transmits the usage request to the server apparatus 10. Information identifying the terminal apparatus 13 is included in the usage request.

In step S506, the server apparatus 10 transmits a usage confirmation request to the vehicle 12 identified in the usage request. The information contained in the usage request is included in the usage confirmation request. The vehicle 12 displays information to the driver on the boarding point and boarding time, for example. The driver inputs the usage confirmation to the vehicle 12. The usage confirmation includes information indicating whether the usage request will be accepted. For example, the driver inputs the usage confirmation by tapping a button indicating acceptance of the usage request. In step S508, the vehicle 12 transmits the usage confirmation to the server apparatus. Upon receiving the usage confirmation, the server apparatus 10 performs steps S510 and S512. In a case in which one or more of the components of the vehicle 12 illustrated in FIG. 3 is configured as a terminal apparatus having information processing functions, and the terminal apparatus is carried by the driver, steps S506 and S508 may be performed by the terminal apparatus.

In step S510, the server apparatus 10 transmits usage information to the terminal apparatus 13. The usage information indicates that the usage request has been accepted. The terminal apparatus 13 displays the usage information to the user. Once the user confirms acceptance of the usage request, the user travels to the boarding point carrying the terminal apparatus 13.

In step S512, the server apparatus 10 transmits a travel start instruction to the vehicle 12. Once the vehicle 12 receives the travel start instruction, the vehicle 12 starts traveling from its current position toward the boarding point.

Steps S514 to S522 are performed in any appropriate cycles (for example, in cycles of several milliseconds to several seconds).

In step S514, the vehicle 12 transmits a captured image and positional information to the server apparatus 10. The captured image is a captured image of the surroundings of the vehicle 12 and is obtained by, for example, capturing an image of the scenery/subjects in the travel direction of, to the sides of, or behind the vehicle 12. The captured image may be a moving image captured at any appropriate frame rate (for example, 30 FPS). Here, the cycles for image capture, positional information acquisition, and transmission of the captured image and positional information may be different.

Upon receiving the usage information, the terminal apparatus 13 transmits positional information to the server apparatus 10 in step S516. Here, the server apparatus 10 aborts the subsequent steps in a case in which the position of vehicle 12 and the position of the terminal apparatus 13 are both the same as the boarding point.

In step S518, the server apparatus 10 determines the captured image to be transmitted. The server apparatus 10 determines the captured image to be transmitted based on the positional information transmitted from the vehicle 12 together with the captured image. The positional information transmitted from the vehicle 12 together with the captured image generally corresponds to the point where the image was captured. Here, for example, the server apparatus 10 determines the captured image transmitted together with the positional information as the captured image to be transmitted on the condition that the position of the vehicle 12 indicated by the positional information is within a reference range from the boarding point. Alternatively, in a case in which the positional information transmitted from the terminal apparatus 13 and the positional information transmitted from the vehicle 12 match, the server apparatus 10 may determine the captured image transmitted together with the positional information as the captured image to be transmitted.

In step S520, the server apparatus 10 transmits the determined captured image and the positional information transmitted from the vehicle 12 together with the captured image to the terminal apparatus 13. At this time, the server apparatus 10 may transmit the captured image and the like on the condition that the position of the terminal apparatus 13 is within the reference range from the boarding point.

In step S522, the terminal apparatus 13 outputs the captured image and positional information transmitted from the server apparatus 10. The terminal apparatus 13 displays a map 6, as illustrated in FIG. 6B, for example, that includes the position 60 of the vehicle 12, the current position 63 of the terminal apparatus 13, and the boarding point 62. The boundary 64 of the reference range may be displayed on the map 6. Here, the position 60 of the vehicle 12 is within the reference range, and therefore the terminal apparatus 13 displays the captured image 61. The captured image 61 is, for example, an image of the scenery in the travel direction of the vehicle 12. The captured image 61 is a moving image. The captured image 61 may be superimposed on the map 6, as in FIG. 6B, or may be displayed on a portion of the display other than the map 6.

According to the present embodiment, when moving to the boarding point, the user can view the captured image, on the terminal apparatus 13, of the surroundings of the vehicle 12 that is heading to the boarding point. Even if the user is unfamiliar with the boarding point, the user can identify the boarding point more easily than with a map and can efficiently meet up with the vehicle 12.

Since the degree of contribution to the identification of the boarding point is relatively low during a display of captured images of points more than a certain distance from the boarding point, unnecessary processing and information communication can be omitted by displaying only images captured within the reference range. Furthermore, when the user moves to the boarding point, the degree of contribution to the identification of the boarding point is relatively low upon comparing the captured image with the scenery at a point more than a certain distance from the boarding point. Therefore, by requiring the terminal apparatus 13 to be within the reference range as a condition for captured image output, the user can more easily compare the captured image with the surrounding scenery. The boarding point can thereby be identified more reliably.

Alternatively, in a case in which the user is moving to the boarding point, and the user moves by a point that the vehicle 12 has passed, i.e., in a case in which the positional information acquired by the server apparatus 10 from the vehicle 12 matches the positional information for the terminal apparatus 13, the captured image that was captured at that position is transmitted to the terminal apparatus 13 for display. With this configuration, the user can more reliably identify the boarding point by comparing the captured image with the surrounding scenery. Furthermore, the terminal apparatus 13 may display the trajectory of the position of the vehicle 12, and the captured image for a point selected by the user on the trajectory may be displayed. For example, the user can select any point on the trajectory of the vehicle 12 on the map 6 with a tap operation or the like, and based on the selection, the server apparatus 10 can transmit the captured image of the selected point to the terminal apparatus 13. This configuration can improve user convenience.

In the above embodiment, the server apparatus 10 selects the captured image to be transmitted to the terminal apparatus 13 based on the positional information from the vehicle 12. However, the server apparatus 10 may transmit information on the reference range to the vehicle 12 together with a travel start instruction, and the vehicle 12 may determine whether to perform or abort imaging or transmission of the captured image based on the current position of the vehicle 12 itself. In other words, when the current position of the vehicle 12 itself is within the reference range, the vehicle 12 captures an image and transmits the captured image to the server apparatus 10. Alternatively, the vehicle 12 periodically captures images and transmits a captured image to the server apparatus 10 when the current position of the vehicle 12 itself is within the reference range. With this configuration, concentration of the processing load on the server apparatus 10 in a case in which the server apparatus 10 manages a plurality of vehicles 12 can be avoided.

In the above embodiment, a processing/control program that specifies operations of the vehicle 12 and the terminal apparatus 13 may be stored in the memory 22 of the server apparatus 10 or in the memory of another server apparatus and be downloaded onto each apparatus via the network 11. The processing/control program may also be stored on a non-transitory recording/storage medium readable by each apparatus, and each apparatus may read the program from the medium.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A server apparatus comprising:
a communication interface; and
a controller configured to transmit and receive information to and from another apparatus via the communication interface, wherein
the controller is configured to transmit information to a vehicle about a boarding point, designated by a terminal apparatus, at which a user is to board the vehicle, and transmit, to the terminal apparatus, a captured image of surroundings of the vehicle, the captured image being captured by the vehicle during travel to the boarding point, at a point selected by the terminal apparatus on a trajectory of the vehicle to the boarding point.

2. The server apparatus according to claim 1, wherein the controller is configured to select a captured image within a reference range from the boarding point and transmit the captured image to the terminal apparatus.

3. The server apparatus according to claim 2, wherein the controller is configured to receive information designating the reference range from the terminal apparatus.

4. The server apparatus according to claim 2, wherein the controller is configured to transmit the captured image to the terminal apparatus on a condition that the terminal apparatus is located within the reference range.

5. The server apparatus according to claim 2, wherein the controller is configured to transmit the captured image for a point designated by the terminal apparatus to the terminal apparatus.

6. The server apparatus according to claim 4, wherein the controller is configured to transmit, to the terminal apparatus, a captured image captured at a point corresponding to a position of the terminal apparatus.

7. The server apparatus according to claim 1, wherein the controller is configured to abort transmission of the captured image when the vehicle and the terminal apparatus are located at the boarding point.

8. A system comprising a server apparatus and a vehicle configured to communicate with each other, wherein
the server apparatus is configured to transmit information to the vehicle about a boarding point, designated by a terminal apparatus, at which a user is to board the vehicle,
the vehicle is configured to capture an image of surroundings of the vehicle during travel to the boarding point, at a point selected by the terminal apparatus on a trajectory of the vehicle to the boarding point, and
the server apparatus is configured to transmit the captured image to the terminal apparatus.

9. The system according to claim 8, wherein the server apparatus is configured to select a captured image within a reference range from the boarding point and transmit the captured image to the terminal apparatus.

10. The system according to claim 9, wherein the server apparatus is configured to receive information designating the reference range from the terminal apparatus.

11. The system according to claim 9, wherein the server apparatus is configured to transmit the captured image to the terminal apparatus on a condition that the terminal apparatus is located within the reference range.

12. The system according to claim 9, wherein the server apparatus is configured to transmit the captured image for a point designated by the terminal apparatus to the terminal apparatus.

13. The system according to claim 11, wherein the server apparatus is configured to transmit, to the terminal apparatus, a captured image captured at a point corresponding to a position of the terminal apparatus.

14. The system according to claim 8, wherein the server apparatus is configured to abort transmission of the captured image when the vehicle and the terminal apparatus are located at the boarding point.

15. An operating method of a system comprising a server apparatus and a vehicle configured to communicate with each other, the operating method comprising:

transmitting, by the server apparatus, information to the vehicle about a boarding point, designated by a terminal apparatus, at which a user is to board the vehicle;

capturing, by the vehicle, an image of surroundings of the vehicle during travel to the boarding point, at a point selected by the terminal apparatus on a trajectory of the vehicle to the boarding point; and

transmitting, by the server apparatus, the captured image to the terminal apparatus.

16. The operating method according to claim 15, wherein the server apparatus selects a captured image within a reference range from the boarding point and transmits the captured image to the terminal apparatus.

17. The operating method according to claim 16, wherein the server apparatus receives information designating the reference range from the terminal apparatus.

18. The operating method according to claim 16, wherein the server apparatus transmits the captured image to the terminal apparatus on a condition that the terminal apparatus is located within the reference range.

19. The operating method according to claim 16, wherein the server apparatus transmits the captured image for a point designated by the terminal apparatus to the terminal apparatus.

20. The operating method according to claim 18, wherein the server apparatus transmits, to the terminal apparatus, a captured image captured at a point corresponding to a position of the terminal apparatus.

* * * * *